2,787,580
PROCESS OF PRODUCING ANTIBIOTIC P. A. 114

Ben A. Sobin, Flushing, Arthur R. English, East Meadow, and Thomas M. Lees, Baldwin, N. Y., and John B. Routien, Tenafly, N. J., assignors to Chas. Pfizer & Co., Inc., Brooklyn, N. Y., a corporation of Delaware No Drawing. Application November 12, 1953,
Serial No. 391,766

3 Claims. (Cl. 195—80)

This invention relates to a new and useful antibiotic containing product called p. a. 114, and more particularly to its production by fermentation, to methods for its recovery and concentration from crude solutions, such as fermentation broths, and to processes for its purification. The invention includes within its scope dilute forms of the p. a. 114, as well as crude concentrates and its purified forms. These novel products are especially effective against Gram-positive microorganisms and pathogenic mycobacteria. They are useful in separating and/or classifying mixtures of microorganisms for biological research and medical diagnostic purposes. Their utility in human therapy has not as yet been demonstrated.

The new antibiotic containing fermentation product is formed during the cultivation under controlled conditions, of a new strain of a species of microorganism known as *Streptomyces olivaceus*. The cultural characteristics of this microorganism were determined by planting a culture thereof on media normally used for the indentification of Actinomycetes and observing the growth and/or other changes incident thereto. While this new strain, designated Isolate No. 15920-19, conforms in many respects to the description of *S. olivaceus* set forth in Bergey's "Manual of Determinative Bacteriology," sixth edition (1948), a number of significant differences from that description were observed. A culture of the living organism has been deposited with the American Type Culture Collection at Washington, D. C., and has been added to its permanent collection of microorganisms as ATCC No. 12019.

The cultural chaarcteristics of the new strain designated as *S. olivaceus* ATCC No. 12019 are set forth in the following table, wherein the results are based upon six tubes or plates of each medium incubated for two weeks. The colors where R is written are those of Ridgway, "Color Standards and Nomenclature."

In the following table are listed some of the significant differences between our new strain ATCC No. 12019 and the description of *S. olivaceus* appearing in Bergey's manual.

TABLE II

| Medium | Strain ATCC No. 12019 | Bergey's Description |
| --- | --- | --- |
| Glucose Asparagine Agar. | Spores oval, 0.95–1.3 x 0.65–0.95μ. | Conidia spherical and oval, 0.9–1.1 x 0.9–2μ. |
| Synthetic Agar | Reverse light brown | Growth developing deep into medium, yellow to olive-ochre, reverse yellow to almost black. |
| Skimmed milk | Ring creamy white, Ochraceous Salmon (R) soluble pigment; no coagulation; hydrolyzed. | (Litmus milk.) Faint, pinkish growth, coagulated, peptonized. |
| Dextrose-nitrate broth | No reduction | Reduction. |
| Starch plates | No hydrolysis | Hydrolysis. |

It is understood that in the production of p. a. 114 the present invention embraces not only organisms answering the above description in Tables I and II, given merely for illustrative purposes, but also it embraces the use of mutants produced from the described organism by various means, such as X-radiation, ultraviolet radiation, nitrogen mustards, and the like.

As indicated above, the antibiotic containing product p. a. 114 is particularly noteworthy in its action against Gram-positive microorganisms and pathogenic mycobacteria. It is further active against the rickettsiae and larger viruses. The following table illustrates the antibiotic spectrum of p. a. 114 against a variety of Gram-negative, Gram-positive microorganisms, and mycobacteria. These tests were run by seeding nutrient medium containing various concentrations of the fermentation product with the particular organism specified. The "minimum inhibitory concentration" indicated in Table III is the minimum concentration of the p. a. 114 (in micrograms/milliliter) at which growth of the microorganism failed to occur. Since the highest concentration employed in this test was 100 mcg./ml., the "minimum inhibitory concentration" is not precisely stated where such concentration apparently exceeded 100 mcg./ml. The test was conducted under standardized conditions.

TABLE I
*Streptomyces olivaceus—ATCC No. 12019*

| Medium | Amount of Growth | Color | | Remarks |
| --- | --- | --- | --- | --- |
| | | Sporulation and Aerial Mycelium | Soluble Pigment | |
| Glucose Asparagine Agar | Poor to moderate | Creamy-white waxy growth; sporulation between Pale Mouse Gray (R) and Pallid Mouse Gray (R). | None | Reverse creamy white; spores in straight chains, oval, measuring 1.30 (.95) x .66 (.95)μ. |
| Skimmed Milk | Moderate | Creamy white ring | Ochraceous Salmon (R). | Milk hydrolyzed; strongly proteolytic (30% of N converted to amino N in 14 days); becoming strongly alkaline. |
| Glucose Agar | do | Sporulation between Pale Mouse Gray (R) and Light Mouse Gray (R). | Very light brown | Reverse creamy white. |
| Nutrient Agar | Poor | Creamy white waxy; no sporulation. | None | Do. |
| Synthetic Agar | Good | Pallid Mouse Gray (R) sporulation. | Light brown | Reverse light brown. |
| Calcium Malate | Moderate | Sporulation near Pale Mouse Gray (R). | None | Reverse creamy white. |
| Cellulose | Good | Near Pallid Mouse Gray (R) | Light brown | |
| Potato Disc | Moderate | White to light gray aerial mycelium. | | |
| Starch Plates | do | White aerial mycelium | None | Reverse white; no hydrolysis. |
| Gelatin Plates | do | Creamy white waxy | do | Zone of liquefaction: 1½–2 cm. |
| Dextrose Nitrate Broth | do | | | Nitrates not reduced. |
| Emerson Agar | do | Sporulation poor, light gray | Medium brown | Reverse creamy white. |

TABLE III

*P. a. 114 spectrum*

| Organism | Minimum Inhibitory Concentration, p. a. 114, mcg./ml. |
|---|---|
| Gram-Positive Organisms: | |
| M. pyogenes var. aureus 5 | <0.19 |
| B. subtilis | 0.39 |
| Str. faecalis A121 | <0.19 |
| Gram-Negative Organisms: | |
| Brucella bronchiseptica | 12.5 |
| K. pneumoniae | >100 |
| Salmonella typhosa | 100 |
| Salmonella paratyphi A | 50 |
| Salmonella paratyphi B | >100 |
| A. aerogenes AC2 | 25 |
| A. aerogenes MT2 | 50 |
| A. aerogenes parent | 50 |
| E. coli | >100 |
| Proteus sp | >100 |
| Pseudomonas sp | 100 |
| Mycobacteria: | |
| Ranae | 12.5 |
| 607 | 3.12 |
| Phlei | 3.12 |
| Smegmatis | 3.12 |
| Berolinense | 6.25 |
| Butyricum | 12.5 |
| Fungi: Candida albicans | >100 |

As indicated above, p. a. 114 is highly active against the Gram-positive microorganisms, moderately active against the saprophytic mycobacteria and has some activity against the Gram-negative microorganisms. Some activity was also observed against pathogenic Protozoa, as indicated in the following table.

TABLE IV

*P. a. 114 spectrum: Protozoa*

| Organism | Minimum Inhibitory Concentration, p. a. 114, mcg./ml. |
|---|---|
| E. histolytica | 250 |
| T. vaginalis | [1] 500 |

[1] Partial inhibition was observed at 65 mcg./ml.

P. a. 114 also showed high activity against a large number of resistant strains of *Micrococcus pyogenes* var. *aureus*, as indicated in Table V. These strains were isolated from clinical cases infected therewith and found to be resistant to one or more of the commercially available antibiotics, i. e., penicillin, streptomycin, oxytetracycline, chlortetracycline, chloramphenicol, bacitracin and polymyxin.

TABLE V

*Activity of p. a. 114 against M. pyogenes var. aureus, resistant strains*

| Strain No. | Minimum Inhibitory Concentration p. a. 114; mcg./ml. |
|---|---|
| 742 | <0.19 |
| P/r | 0.19 |
| Y-1 | <0.19 |
| 376 | <0.19 |
| 956 | 0.39 |
| 2871 | 0.39 |
| 2877 | 0.39 |
| 2326 | 0.78 |
| 2866 | 0.78 |
| 2868 | 0.78 |
| 2873 | 0.78 |
| 2876 | 0.78 |
| 2878 | 0.78 |
| 2904 | 0.78 |
| 2909 | 0.78 |
| 738 | 3.12 |

As indicated in Table III, the antibiotic containing fermentation product is effective against the saprophytic mycobacteria; more important, however, it is also effective against the pathogenic mycobacteria, such as *Mycobacterium tuberculosis* var. *hominis*, including strains thereof which are resistant to various known tuberculostatic agents. The "minimum inhibitory concentration" of p. a. 114 when tested against a number of strains of *Mycobacterium tuberculosis* var. *hominis*, resistant and non-resistant, is set forth below in Table VI. These tests were conducted as above indicated, employing a 14 day incubation period for the respective organisms in Dubos Tween-Albumin liquid medium.

TABLE VI

*Activity of p. a. 114 against Mycobacterium tuberculosis*

| M. tuberculosis Strain | Resistant to— | Minimum Inhibitory Concentration p. a. 114, mcg./ml. |
|---|---|---|
| $H_{37}Rv$ (CDC) | | Between 0.78 and 1.56 |
| $H_{37}Rv$ (ATC) | | 1.56 |
| 9181 | | 0.78 |
| Ravenel | | 0.19 |
| $H_{37}Rv$ | Streptomycin at 100 mcg./ml | 0.39 |
| $H_{37}Rv$ | Isoniazid at 50-100 mcg./ml | 0.19 |

It is apparent from the above table that the antibiotic containing product displayed a high order of activity against streptomycin and isoniazid (isonicotinic acid hydrazide) resistant organisms, comparable to the activity observed against non-resistant organisms. The activity against the resistant organisms is particularly significant when it is appreciated that these same organisms remained resistant to streptomycin and isoniazid at concentrations as high as 100 mcg./ml. of these tuberculostatic agents.

A series of animal protection studies in mice indicated that the product p. a. 114 retains its activity against resistant and non-resistant strains of *M. pyogenes* var. *aureus* in vivo. In these studies, the animals were infected with from 1 to 10 times the lethal dose of *M. pyogenes* var. *aureus* No. 5 for one series of experiments and with from 10 to 100 times the lethal dose of *M. pyogenes* var. *aureus* Y-1 for another series of experiments. The antibiotic containing fermentation product was then administered one-half hour after infection in a single dose at varying concentrations by the subcutaneous and oral routes. The concentrations of the product employed were 25, 50, 100 and 200 mg./kg. of body weight. The results of these experiments appear below in Table VII.

TABLE VII

*Activity of p. a. 114 against M. pyogenes var. aureus in vivo*

| Strain | Degree of Infection | Antibiotic p. a. 114 | | Survival at 4 Days, Percent |
|---|---|---|---|---|
| | | Route | Concentration, mg./kg. | |
| M. pyogenes var. aureus 5 (nonresistant) | 1-10 times lethal dose | Subcut | 200 | 100 |
| | | | 100 | 100 |
| | | | 50 | 100 |
| | | | 25 | 40 |
| | | Oral | 200 | 80 |
| | | | 100 | 80 |
| | | | 50 | 0 |
| | | | 25 | 0 |
| M. pyogenes var. aureus Y-1 (Resistant) | 10-100 times lethal dose | Subcut | 200 | 100 |
| | | | 100 | 100 |
| | | | 50 | 30 |
| | | | 25 | 50 |
| | | Oral | 200 | 20 |
| | | | 100 | 0 |
| | | | 50 | 0 |
| | | | 25 | 0 |

As will be apparent from Table VII, p. a. 114 showed 100% protection at the 200, 100 and 50 mg./kg. levels in mice infected with *M. pyogenes* var. *aureus* 5, followed by subcutaneous administration of the antibiotic containing product. Slightly less protection was observed at 25 mg./kg. When the route was oral, 80% protection was afforded by 200 and 100 mg./kg. of the new substance. It is further apparent that mice infected with the antibiotic-resistant Y-1 strain of *M. pyogenes* var. *aureus* were also protected by 200 and 100 mg./kg. of p. a. 114 administered subcutaneously, whereas lesser protection was shown at the 50 and 20 mg./kg. levels.

P. a. 114 has also been found to have activity against the rickettsiae and larger viruses in ovo and in mice as a result of a series of experiments employing *R. akari*, a rickettsiae, and psittacosis, a virus, as the infectious agents. The in ovo activity against these organisms was determined by inoculating eggs with varying concentrations of the antibiotic containing product and 10 or 15 minutes thereafter, infecting such eggs with 10,000 and 5,000 times the $LD_{50}$ of the respective organisms. The $LD_{50}$ is the amount of the organism which is ordinarily lethal to 50% of the eggs infected therewith. The results of these experiments are summarized in Table VIII, wherein the average day of death is set forth for eggs receiving 1, 0.5, 0.25 and 0 mg. of the p. a. 114.

TABLE VIII

*In ovo activity of p. a. 114 against rickettsiae and virus*

| Mircoorganism | Degree of Infection | Average Day of Death | | | |
|---|---|---|---|---|---|
| | | 1 mg. | 0.5 mg. | 0.25 mg. | 0 mg. |
| R. akari | 10,000 times $LD_{50}$ | 11.1 | 9.8 | 8.5 | 6.2 |
| Psittacosis | 5,000 times $LD_{50}$ | 8.3 | 7.2 | 6.5 | 5.2 |

It is apparent, therefore, that p. a. 114 exerted a significant static effect against *R. akari* and psittacosis, the effect increasing with the concentration of the new product.

Further tests demonstrated that p. a. 114 is active in mice against these same microorganisms. The therapeutic activity against psittacosis infection was determined by infecting mice intraperitoneally with 3,000 times the $LD_{50}$ of psittacosis virus. Treatment was begun 24 hours after infection, and a total of 5 daily injections were given at each of the varying concentrations set forth in the following table. In these experiments a standard mouse weighing from 12 to 14 grams was employed.

TABLE IX

*Activity of p. a. 114 against psittacosis virus in mice*

| Antibiotic Concentration, mg./mouse | 1 mg. | 0.5 mg. | 0.25 mg. | 0 mg. |
|---|---|---|---|---|
| Average day of death | 16.6 | 15.8 | 11.8 | 10.2 |

The therapeutic activity against *R. akari* was similarly determined by infecting mice with approximately 14 times the $LD_{50}$ of the organism. Treatment was given on the first, second, sixth, eleventh and twelfth days at each of the concentrations set forth in Table X. At the end of the 16th day the mortality ratio, i. e., the ratio of dead mice to the total number tested, was determined.

TABLE X

*In vivo activity of p. a. 114 against R. akari*

| Antibiotic Concentration, mg./mouse | 1 mg. | 0.5 mg. | 0 mg. |
|---|---|---|---|
| Mortality ratio | 1/8 | 2/8 | 7/8 |

As indicated in Table X, the number of dead mice decreased as the concentration of the antibiotic containing product was increased.

It should be apparent from the above data that antibiotic p. a. 114 possesses a low level of toxicity in test animals. In the mouse protection studies outlined above, the antibiotic containing product was found to be absorbed readily and to retain its activity in vivo. These characteristics were confirmed by administering the new material to rabbits intramuscularly in an amount of 100 mg./kg. of body weight, and determining the level of p. a. 114 in the serum of the rabbit at various periods up to 24 hours. The level of p. a. 114 in the serum was determined by taking samples of blood from the animal, separating the cells therefrom, and assaying the serum against a standard test organism. The serum levels so determined are shown in the following table.

TABLE XI

*Serum levels of p. a. 114*

| Hours | 0 | 1 | 3 | 5 | 7 | 24 |
|---|---|---|---|---|---|---|
| Mcg./ml. of Serum | 0 | 1.25 | 1.25 | 0.62 | 0.31 | 0.15 |

The invention embraces a process for growing the microorganism *S. olivaceus* ATCC No. 12019 in aqueous nutrient media to form the bacteriologically active products herein described. The cultivation of this microorganism preferably takes place at a temperature of about 24–30° C., and under submerged conditions of agitation and aeration. Nutrient media which are useful for this process include a carbohydrate, such as sugars, starch, glycerol, corn meal, and a source of organic nitrogen, such as casein, soybean meal, peanut meal, wheat gluten, cottonseed meal, lactalbumin, enzymatic digest of casein, tryptone. A source of growth substances, such as distillers' solubles, yeast extract, molasses fermentation residues, as well as mineral salts, such as sodium chloride, potassium phosphate, sodium nitrate, magnesium sulfate and trace minerals such as copper, zinc and iron may also be utilized with desirable results. If excessive foaming is encountered during the fermentation, anti-foaming agents, such as vegetable oils, may be added to the fermentation medium. The pH of the fermentation tends to remain rather constant, but, if variations are encountered, a buffering agent, such as calcium carbonate may also be added to the medium.

Inoculum for the preparation of p. a. 114 by the growth of *S. olivaceus* ATCC No. 12019 may be obtained by employing growth from slants on such media as Emerson's agar or beef lactose. The growth may be used to inoculate either shaken flasks or inoculum tanks for submerged growth, or, alternatively, the inoculum tanks may be seeded from the shaken flasks. The growth of the microorganism usually reaches its maximum in about two or three days. However, variations in the equipment used, the rate of aeration, rate of stirring and so forth may affect the speed with which the maximum activity is reached. In general, from about 24 hours to four days is a desirable period for producing the antibiotic containing fermentation product. Aeration of the medium in tanks for submerged growth is maintained at the rate of about one-half to two volumes of free air per volume of broth per minute. Agitation may be maintained by suitable types of agitators generally familiar to those in the fermentation industry. Aseptic conditions must, of course, be maintained throughout the transfer of the inoculum and throughout the growth of the microorganism.

After growth of the microorganism, the mycelium may be removed from the fermentation broth by means of standard equipment, such as filter-presses, centrifuges, and so forth. Thereafter, p. a. 114 may be recovered from fermentation broth by several different procedures. Alternatively, the whole broth may be used as is or it may be dried. The antibiotic containing product may be further purified by various means to obtain from its crude concentrates two distinct crystalline antibiotics, designated p. a. 114A and p. a. 114B. Methods for such separation and purification and a full description of these new crystalline materials are set forth in the copending patent application Serial No. 429,778 filed May 14, 1954, by Celmer et al.

The crude p. a. 114 concentrate may also be extracted from aqueous solution at neutral to slightly alkaline pH's, preferably between about 6 and about 10, by means of a variety of water-immiscible organic solvents, including aromatic hydrocarbons, esters, ketones, lower alcohols and halogenated hydrocarbons. Examples of these are diethyl ether, benzene, ethyl acetate, butyl acetate, methyl isobutyl ketone, butanol, and chloroform. The solvent phase resulting from such extraction may be washed with an aqueous alkaline material, such as sodium bicarbonate, to remove acidic substances, and rewashed with water which is readily removed by azeotropic distillation. The antibiotic containing product may then be precipitated from the resulting concentrated solution by the addition of hexane, carbon tetrachloride, or other non-polar solvents in which it is insoluble. It may also be recovered by evaporating the water-immiscible solvent to dryness. Further methods of recovery which suggest themselves include absorption on charcoal with subsequent elution and development on alumina columns.

P. a. 114 as prepared above is an amorphous yellow powder. It is soluble in methanol, ethanol, butanol, chloroform, acetone, dioxane, benzene, ether, methylene chloride, ethylene dichloride, propylene glycol, and methyl acetamide. It is sparingly soluble in water and carbon tetrachloride, but insoluble in hexane. It is stable in a dry state or dissolved in anhydrous solvents. The antibiotic containing substance, in a potassium bromide pellet, shows a number of characteristic peaks in the infrared region, the more significant of which are the following frequencies (in reciprocal centimeters): 3270, 2860, 1710, 1610, 1515, 1450, 1362, 1230, 1177 and 1110. P. a. 114 is clearly distinguished from other antibiotics by its properties, as evidenced by those properties described above and by paper chromatography measurements.

The invention is further illustrated by the following examples, which are not to be considered as imposing any limitation thereon.

EXAMPLE I

A slant of *S. olivaceus* ATCC No. 12019 on Emerson agar was cultivated under controlled conditions to develop spores for the purpose of inoculating a nutrient medium of the following compositions:

| | Grams |
|---|---|
| Cerelose (dextrose hydrate) | 10 |
| Soybean meal | 10 |
| Sodium chloride | 5 |
| Distillers' solubles | 5 |
| Calcium carbonate | 1 |

This mixture of nutrients was diluted to a volume of one liter with water, adjusted to a pH of 7 with potassium hydroxide, and subjected to heat sterilization. Thereafter, the medium was cooled and the spores were added thereto under aseptic conditions. The cultivation of the organism was conducted in shaken flasks at about 25° C. for a period of two days. The mixture of broth and mycelium thus formed was then transferred to 20 times its volume of a sterile fermentation medium having the following compositions:

| | Grams/liter |
|---|---|
| Cerelose | 10 |
| Sodium chloride | 5 |
| Curbay Bg | 5 |
| Corn starch | 10 |
| Soybean meal | 10 |

This medium was adjusted to pH 7 with potassium hydroxide, treated with 1 gram of calcium carbonate per liter, and sterilized in the usual manner, before transferring the broth and mycelium thereto. After seeding the medium with the organism from the shaken flasks, the mixture was subjected to agitation and aeration under sterile conditions for three days. The potency of the broth at this point was found to be 100 mcg./ml. The mycelium was removed by filtration and extracted twice with one-quarter volume of ethyl acetate. The ethyl acetate extract was concentrated in vacuo to one-twentieth its volume. This concentrate was washed twice with one-tenth volume of 5% sodium bicarbonate, and then twice with one-tenth volume of water. The ethyl acetate extract was then distilled azeotropically to remove the water present, and the antibiotic containing product p. a. 114, was precipitated by the addition of five volumes of hexane. The precipitated yellow powder was removed by filtration. This powder represented a 160 fold concentration over the original broth after freeze drying the same. The product thus prepared was further purified by dissolving the same in methylene chloride and fractionally precipitating impurities with carbon tetrachloride, leaving the p. a. 114 in solution. Upon evaporation of the solvent, a light cream colored solid of high activity was obtained.

EXAMPLE II

Another fermentation medium was prepared from the following materials:

| | Grams |
|---|---|
| Corn starch | 10 |
| Glycerol | 10 |
| NZ Amine B | 20 |
| Distillers' solubles | 5 |

These materials were added to one liter of water and the pH of the resulting mixture was adjusted to between 7 and 7.2 with potassium hydroxide. Five grams of calcium carbonate were added to act as a buffer during the fermentation. The medium was then autoclaved and seeded under sterile conditions with *S. olivaceous* inoculum prepared in accordance with the procedure set forth in Example I. After subjecting the inoculated medium to aeration and agitation under sterile conditions at about 28° C. for two days, the filtered broth was found to contain 100 micrograms of p. a. 114 per ml. of solution.

Resort may be had to such modifications and equivalents as fall within the spirit of the invention and the scope of the appended claims.

What we claim is:

1. A process for producing the antibiotic containing product p. a. 114, which comprises cultivating *Strepomyces olivaceous* ATCC No. 12019 in an aqueous nutrient medium under submerged aerobic conditions until substantial antibacterial activity is imparted to said medium.

2. A process as claimed in claim 1 wherein the p. a. 114 is recovered from the fermentation broth.

3. A process for producing the antibiotic containing product p. a. 114, which comprises cultivating *Streptomyces olivaceous* ATCC No. 12019 in an aqueous nutrient medium under agitated, submerged aerobic conditions at a temperature of from about 24° to about 30° C., for a period of from about one day to about four days.

(References on following page)

References Cited in the file of this patent

UNITED STATES PATENTS

| | | |
|---|---|---|
| 2,482,055 | Duggar | Sept. 13, 1949 |
| 2,653,899 | Bunch et al. | Sept. 29, 1953 |

OTHER REFERENCES

Waksman: "The Actinomycetes," publ. 1950 by the Chronica Botanica Co., Waltham, Mass., pp. 116–117.

Waksman: Actinomycetes and Their Antibiotics, publ. 1953 by Williams & Wilkins Co., Baltimore, Md., pp. 168–184.

Waksman: "Actinomycetes and Their Antibiotics," pages 75, 76, and 88, pub. by Williams & Wilkins, Baltimore, Md., 1953.

Antibiotic Annual, 1953–54, pub. by Med. Encylopedia Inc., December 1953, pp. 171–173, Speech delivered: Oct. 30, 1953.

De Somer et al.: Antibiotics and Chemotherapy, November 1955, pages 632–639.

Celmer et al.: Abstracts of Papers Nos. 59 and 60 presented at Third Annual Symposium on Antibiotics, Nov. 2–4, 1955, Washington, D. C., 2 pages.